United States Patent

Colln

[15] 3,687,974

[45] Aug. 29, 1972

[54] PROCESS FOR THE PREPARATION OF N-(4-CHLOROPHENYLTHIOMETHYL)-PHTHALIMIDE

[72] Inventor: Reimer Colln, Wuppertal-Elberfeld, Germany

[73] Assignee: Farbenfabriken Bayer Aktiengesellschaft, Leverkusen, Germany

[22] Filed: Aug. 13, 1970

[21] Appl. No.: 63,607

[30] Foreign Application Priority Data

Sept. 3, 1969  Germany..........P 19 44 700.8

[52] U.S. Cl..............................260/326 S, 260/999
[51] Int. Cl..........................................C07d 27/52
[58] Field of Search..................................260/326 S

[56] References Cited

UNITED STATES PATENTS 3,200,146  8/1965  Weil et al. ..................260/543

*Primary Examiner*—Alex Mazel
*Assistant Examiner*—Joseph A. Narcavage
*Attorney*—Burgess, Dinklage & Sprung

[57] ABSTRACT

Reacting phthalimide methylol with 4-chlorothiophenol in the presence of concentrated sulfuric acid in an inert solvent immiscible with sulfuric acid at temperatures of 20° to 80° C. in a two-phase system, to form in high yield and purity N-(4-chlorophenylthiomethyl)-phthalimide which possesses fungicidal properties.

6 Claims, No Drawings

PROCESS FOR THE PREPARATION OF N-(4-CHLOROPHENYLTHIOMETHYL)-PHTHALIMIDE

The present invention relates to and has for its object the provision of a particular new method of reacting phthalimide methylol with 4-chlorothiophenol in the presence of concentrated sulfuric acid in an inert solvent immiscible with sulfuric acid at temperatures of 20° to 80° C. in a two-phase system, to form N-(4-chlorophenylthiomethyl)-phthalimide, which is a fungicide, e.g., in a simple reaction, using readily available starting materials and resulting in outstanding yields and purity, with other and further objects of the invention becoming apparent from a study of the within specification and accompanying examples.

It is known from Belgian Pat. Specification No. 699,169 that N-(4-chlorophenylthiomethyl)-phthalimide, disclosed as a fungicide, is obtained when an N-halomethyl-phthalimide is reacted with 4-chlorothiophenol in the presence of an acid-binding agent. This process, however, has the disadvantage that the N-halomethylphthalimide required as starting material can only be obtained by a relatively involved two-step method which is time-consuming and expensive, starting with phthalimide. Hence, for the preparation of the final compound starting from phthalimide, three separate reaction steps according to the following scheme have to be gone through:

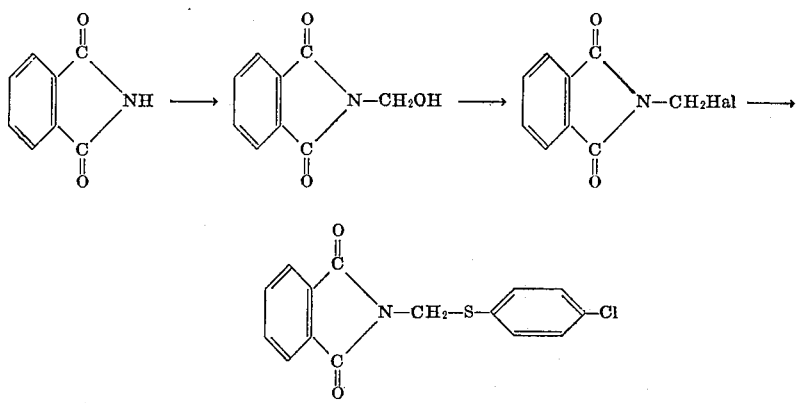

The present invention provides a process which is relatively simple and efficient. In this process, N-(4-chlorophenylthiomethyl)-phthalimide of the formula

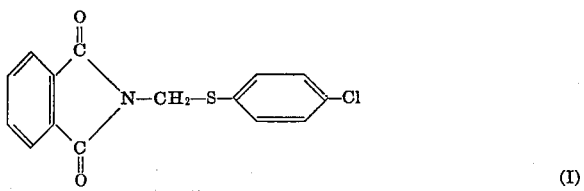

(I)

is obtained when phthalimide methylol of the formula

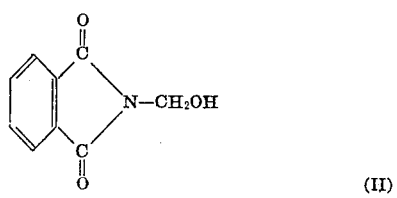

(II)

is reacted with 4-chlorothiophenol of the formula

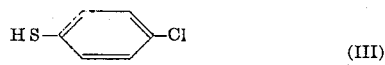

(III)

in the presence of concentrated sulfuric acid in an inert solvent immiscible with sulfuric acid at temperatures of 20° to 80° C. in a two-phase system.

It is very surprising that, under these reaction conditions, the desired end product of the formula (1) is obtained for it is known, from Berichte der Deutschen Chemischen Gesellschaft 42, 1170 (1909), that thiophenols and concentrated sulfuric acid act on one another with formation of disulfides and sulfurous acid. It is also known from German Pat. Specification No. 134,979, that phthalimidemethylol, when treated with concentrated sulfuric acid, is converted into bis-phthalimidomethyl ether, with the splitting off of water. Accordingly, it would have been expected that these known reactions would mean that the reaction course according to the invention was impossible. Further, it is known, from German Pat. Specification No. 134,979, that phthalimidemethylol, in the presence of concentrated sulfuric acid, reacts with aromatic compounds, for example even phenols, with nuclear substitution ("Cherniac reaction"). Since 4-chlorothiophenol is an aromatic compound, a nuclear substitution was therefore to be expected.

Moreover, in the carrying out of the process according to the invention, the high yield of the end product of the formula (1) is surprising, since when one uses thiophenol, which is chemically very close to the 4-chlorothiophenol used according to the invention, under the same reaction conditions one obtains only a generally much lower yield of the appropriate reaction product, so that the reaction of thiophenol, instead of 4-chlorothiophenol, in a method analogous to that of the invention is practically of no importance (see Comparative Example 1 hereinbelow).

In the Journal of Chemical and Engineering Data 11 (1966), 620–621, there is a report on the reaction of 4-chlorothiophenol with diethylamine and formaldehyde in the presence of water. The diethylaminemethylol occurring as intermediate product reacts, according to this, without catalyst and other additives, with 4-chlorothiophenol, with splitting off of water, to give 4-chlorophenylthiomethyldiethylamine. These conditions, when phthalimide is used instead of diethylamine or when phthalimidemethylol is used instead of the intermediately formed diethylaminemethylol, do not lead to any reaction (see Comparative Example 2), not even when the lack of basicity of phthalimide, compared with diethylamine, is compensated for by addition of an equivalent of triethylamine (see Comparative Example 3).

The reaction according to the invention cannot be carried out at all in the presence of considerable amounts of water, not even when the necessary amount of sulfuric acid is present (see Comparative Example 4). Even in anhydrous reaction medium, no reaction corresponding to the reaction according to the invention takes place if no additives (see Comparative Example 5), or if other acidic additives instead of concentrated sulfuric acid, are used, as for example toluenesulfonic acid, chlorosulfonic acid or gaseous hydrogen chloride (see Comparative Example 6).

From all this, it can be seen that the reaction according to the invention appears to be narrowly restricted and, incapable of generalization, being a specific preparative method for the product of the formula (1).

The process according to the invention exhibits a number of advantages. One is its simple industrial operability. Another is the reduction of the number of reaction steps. Another is that in the process according to the invention the use of an acid-binding agent and the removal of the salt formed therefrom are unnecessary.

The reaction course can be represented by the following formula scheme:

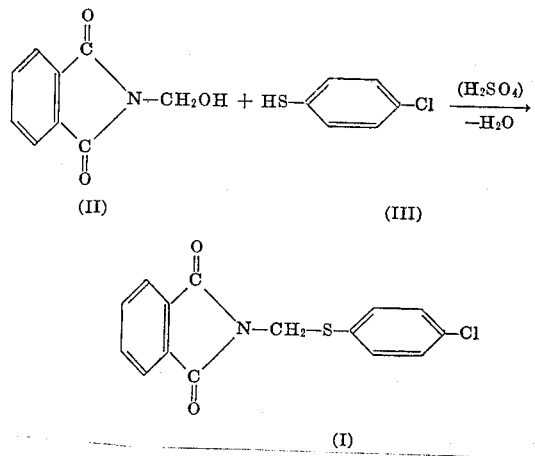

The starting materials are defined by the formulas (II) and (III) and are known.

As diluents, all inert organic solvents are suitable which are immiscible with concentrated sulfuric acid and do not react with it. Preferred solvents include chlorinated aliphatic hydrocarbons, especially chlorinated lower alkanes, such as dichloroethane, chloroform and carbon tetrachloride.

The reaction temperatures can be varied within a fairly wide range. In general, the work is carried out at about 20° to 80° C., preferably at about 40° to 60° C.

When carrying out the process according to the invention, approximately equimolar amounts of the starting materials may be used; these may be mixed with the diluent, and an approximately equimolar amount of concentrated sulfuric acid may be added to the mixture. After stirring for about one hour at 40° to 50° C., the reaction product may be isolated by adding ice, separating the sulfuric acid or washing it out with water, drying the solution, removing the solvent under reduced pressure, crystallizing the residue with a little acetone or another suitable solvent, putting the crystalline reaction product on a suction filter and drying in an air stream.

In a particular method of carrying out the process of the invention, one starts not from the phthalimidemethylol itself but from phthalimide and paraformaldehyde which may be considered as forming the phthalimidemethylol although the latter need not be identified or isolated. The whole process may then be carried out as a one-pot process. When carrying out this particular method, one may use approximately equivalent amounts of phthalimide and paraformaldehyde, mixed with the diluent, adding an equimolar amount of concentrated sulfuric acid, stirring the mixture for about 30 minutes at 40° to 50° C., adding the equimolar amount of 4-chlorothiophenol and further stirring for about an hour at 40° to 50° C. Isolation of the reaction product may be carried out in the same manner as stated above.

The invention provides a fungicidal composition containing as active ingredient the product of the process according to the invention in admixture with a solid diluent or carrier or in admixture with a liquid diluent or carrier containing a surface-active agent. The diluent or carrier may be any of those which are conventional in the art. The composition generally contains 0.1–95 percent of the active compound, by weight.

The following examples illustrate the process according to the invention:

EXAMPLE 1

177.2 g (1 mole) of N-hydroxymethylphthalimide, 144.6 g (1 mole) of 4-chlorothiophenol and 800 ml of ethylene chloride are mixed in a 2-liter three-necked flask with stirring device and reflux condenser. To this mixture there are added, in the course of about 5 minutes at about 35° C., 100 g (about 1 mole) concentrated sulfuric acid (95–97 percent strength). After a few minutes, the undissolved matter dissolves with slightly exothermic reaction. The mixture is allowed to continue reacting at 40° to 50° C. for an hour with stirring, and cooling to 20° C. is then effected. For the working up of the reaction product, 100 g of ice are added, the phases are separated, and the organic phase is washed neutral by shaking with 5 percent solution of sodium hydroxide in water. The solution is dried with 100 g sodium sulfate and freed from solvent under reduced pressure until finally there exists, at a bath temperature of 100° C., a vacuum of 15 mm Hg. To the hot melt (293.8 g = 96.8 percent of the theory) are added 290 ml acetone and the mixture is cooled in an ice bath with stirring until crystallization. After stirring for about an hour at −12° C., the contents of the flask are filtered on a suction filter and the residue on the filter is washed twice with, in each case, 50 ml of strongly cooled acetone. There are obtained, after drying in air, 219.2 g of a colorless crystalline powder with the melting point 97° to 98° C. The analytically determined content of active compound of formula (1) is 97.8 percent and the yield is 72.2 percent of the theory.

EXAMPLE 2

147.1 g (1 mole) phthalimide, 30 g (0.33 mole) paraformaldehyde equivalent to (1 mole) formaldehyde and 600 ml ethylene chloride are mixed in a 2-liter three-necked flask with stirring device and reflux condenser. To this mixture there are added at about 35° C., with stirring, 100 g (about 1 mole) of concentrated sulfuric acid (95–97 percent strength). The mixture is stirred for about 30 minutes at 40° to 50° C. There is formed initially a suspension of flocculent-soft product which later changes into a small-spherically divided form. A solution of 144.6 g (1 mole) 4-chlorothiophenol in 200 ml ethylene chloride is then run in very rapidly, with further stirring, and the mixture is allowed to react for about an hour at 40° to 50°

C., with stirring. After cooling to 20° C., the mixture is worked up as described in Example 1. 207.0 g of a colorless crystalline powder with the melting point of 97° to 98° C. are obtained. The analytically determined content of active compound of formula (1) is 97.7 percent and the yield is 68.2 percent of the theory.

From Comparative Example 1 it can be seen that attempted application of the instant process to the preparation of N-(phenylthiomethyl)-phthalimide gives no significant yield.

COMPARATIVE EXAMPLE 1

To a mixture of 53.2 g (0.3 mole) N-hydroxymethylphthalimide, 33.3 g (0.3 mole) thiophenol and 250 ml ethylene chloride there were added at 35° C., with stirring, 30.0 g (about 0.3 mole) of concentrated sulfuric acid (95-97 percent strength) and the mixture was stirred for 1 hour at 40° to 50° C. After cooling, the sulfuric acid was removed as in Examples 1 and 2 and the solution was washed neutral and dried. A thin-layer chromatogram of this solution on silica gel in a system benzene-acetone 19:1 and petroleum ether-acetone 9:1 showed already that by-products had been formed to a much greater extent than in the reactions of Examples 1 and 2. After working up the reaction product, effected analogously with Examples 1 and 2, there was attained, despite several attempts, no higher yield than 37 percent of the theory, corresponding to 29.9 g. Colorless crystals of the melting point 121°–123° C. were obtained.

From the following Comparative Examples 2 to 6, it can be seen that N-(4-chlorophenylthiomethyl phthalimide is not obtained when working according to the teachings of the prior art.

COMPARATIVE EXAMPLE 2

A mixture of 17.7 g (0.1 mole) N-hydroxymethylphthalimide, 35 ml water and 14.4 g (0.1 mole) 4-chlorothio-phenol was stirred at 50° C. for 2.5 hours and the reaction mixture was then extracted with 50 ml ethylene chloride. The extract was investigated for its content of condensation product by thin-layer chromatography or silica gel in a system petroleum ether-acetone 9:1. No trace of condensation product could be detected.

COMPARATIVE EXAMPLE 3

A mixture corresponding to Comparative Example 2, but with the addition of 10.1 g (0.1 mole) triethylamine to the above-mentioned reaction mixture yielded, after thin-layer chromatographic examination, the same negative result as in Example 2.

COMPARATIVE EXAMPLE 4

A mixture corresponding to Example 1 in which, however, instead of 100 g 95-97 percent sulfuric acid, 125 g of 80 percent sulfuric acid were used; this acid concentration no longer effected the desired condensation. The reaction mixture contained, besides much starting material, various unidentified by-products.

COMPARATIVE EXAMPLE 5

A mixture of 17.7 g (0.1 mole) N-hydroxymethylphthalimide, 14.4 g (0.1 mole) 4-chlorothiophenol and 80 ml ethylene chloride was stirred for 3 hours at 50° C. without addition of sulfuric acid. The reaction mixture contained, according to thin-layer chromatographic examination, no desired condensation product.

COMPARATIVE EXAMPLE 6

To a mixture of 17.7 g (0.1 mole) N-hydroxymethylphthalimide, 14.4 g (0.1 mole) 4-chlorothiophenol and 80 ml ethylene chloride in individual runs there were added:
  a. 13.2 g (0.1 mole) p-toluenesulfonic acid,
  b. 11.7 g (0.1 mole) chlorosulfonic acid,
  c. the mixture was saturated with gaseous hydrogen chloride, and each mixture was stirred for three hours at 50° C. In the case (c), gaseous hydrogen chloride continued to be introduced throughout the entire reaction period.

As was found by thin-layer chromatography on silica gel in a 9:1 petroleum ether:acetone system, all reaction mixtures contained, besides much starting product and other unidentified products, only a trace of the desired condensation product, the isolation of which was practically impossible because of its small amount.

It will be appreciated that the instant specification and examples are set forth by way of illustration and not limitation, and that various modifications and changes may be made without departing from the spirit and scope of the present invention.

What is claimed is:

1. A process for the production of N-(4-chlorophenyl-thiomethyl)-phthalimide of the formula

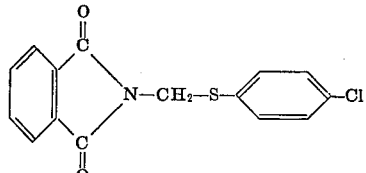

(I)

in which phthalimide methylol of the formula

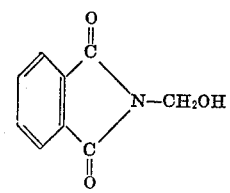

(II)

is reacted with 4-chlorothiophenol of the formula

(III)

in the presence of concentrated sulfuric acid in an inert solvent immiscible with sulfuric acid at temperatures of about 20° to 80° C. in a two-phase system.

2. A process according to claim 1 in which the reaction is carried out at about 40° to 60° C.

3. A process according to claim 1 in which the solvent is a chlorinated aliphatic hydrocarbon.

4. A process according to claim 1 in which approximately equimolar amounts of the reactants are used.

5. A process according to claim 1 in which the phthalimide methylol and 4-chlorothiophenol are mixed with the solvent and the concentrated sulfuric acid is added to the mixture at a temperature of about 40° to 50° C.

6. A process according to claim 1 in which phthalimide and paraformaldehyde are reacted with the 4-chlorothiophenol in the presence of the concentrated sulfuric acid in the inert solvent at 20° to 80° C. in the two-phase system.

* * * * *